(No Model.) 3 Sheets—Sheet 1.
A. DOM & C. H. SHEEN.
PHOTOGRAPHIC PLATE HOLDER AND MECHANISM FOR OPERATING THE SAME.
No. 419,505. Patented Jan. 14, 1890.
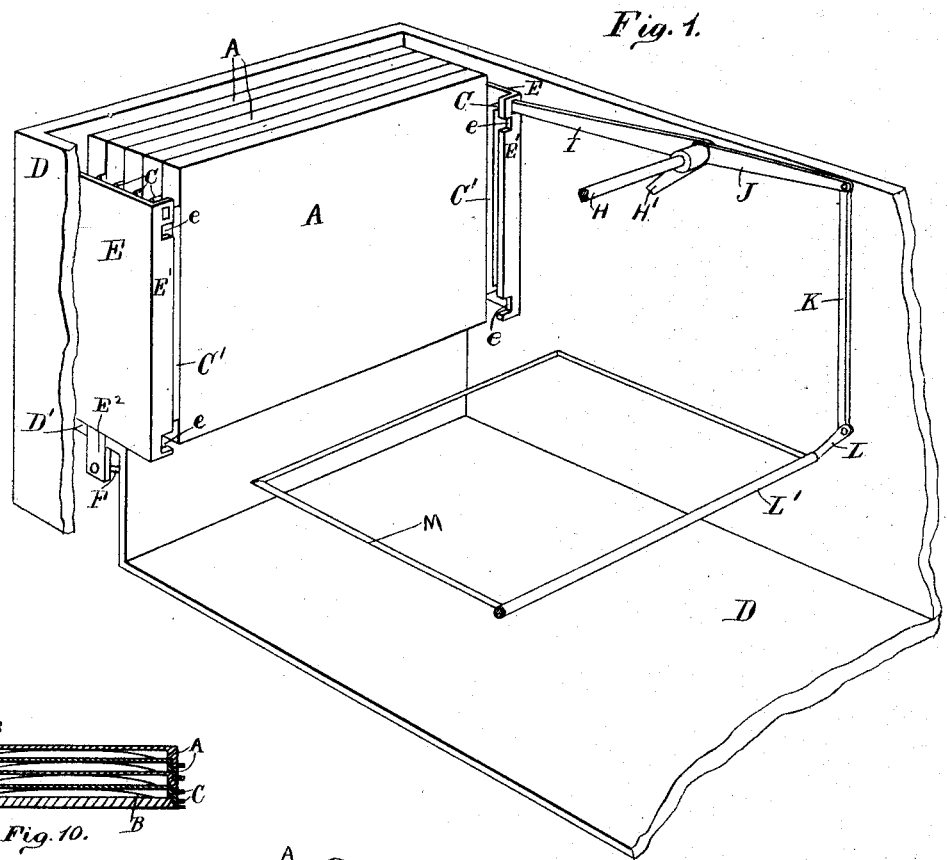
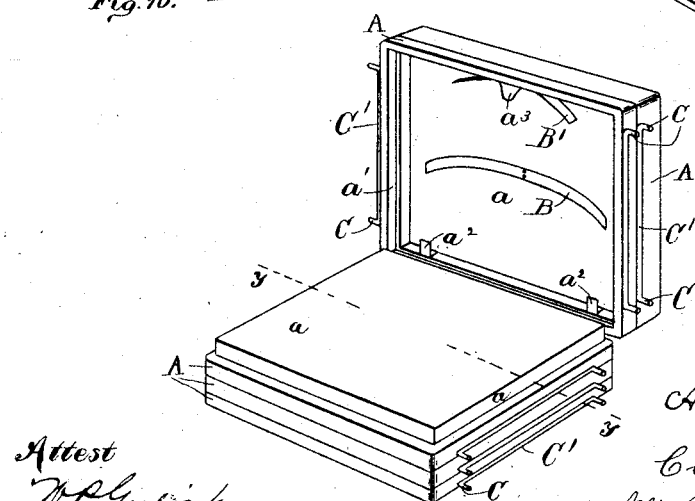

(No Model.) 3 Sheets—Sheet 2.
A. DOM & C. H. SHEEN.
PHOTOGRAPHIC PLATE HOLDER AND MECHANISM FOR OPERATING
THE SAME.

No. 419,505. Patented Jan. 14, 1890.

Attest
W. P. Gulick.
E. M. Harmon.

Inventors.
Alexander Dom
and
Clendon H. Sheen
per Wm. Hubbell Fisher,
Atty.

N. PETERS, Photo-Lithographer, Washington, D. C.

(No Model.) 3 Sheets—Sheet 3.

A. DOM & C. H. SHEEN.
PHOTOGRAPHIC PLATE HOLDER AND MECHANISM FOR OPERATING THE SAME.

No. 419,505. Patented Jan. 14, 1890.

Attest
Benj. C. Smith
W. F. Gulick

Inventor
Alexander Dom
Clendon H. Sheen

UNITED STATES PATENT OFFICE.

ALEXANDER DOM, OF MOUNT HEALTHY, AND CLENDON H. SHEEN, OF CINCINNATI, OHIO.

PHOTOGRAPHIC-PLATE HOLDER AND MECHANISM FOR OPERATING THE SAME.

SPECIFICATION forming part of Letters Patent No. 419,505, dated January 14, 1890.

Application filed July 23, 1887. Serial No. 245,057. (No model.)

*To all whom it may concern:*

Be it known that we, ALEXANDER DOM, of Mount Healthy, Hamilton county, Ohio, and CLENDON H. SHEEN, of Cincinnati, Hamilton county, Ohio, have invented certain new and useful Improvements in Photographic-Plate Holders and Mechanism for Operating the same, of which the following is a specification.

The principal object of our invention is to provide a device for holding a number of photographic plates or films, which may be rapidly brought successively into position, within the camera.

The several features of our invention and the advantages arising from their use, conjointly or otherwise, will be apparent from the following description.

Figure 3:
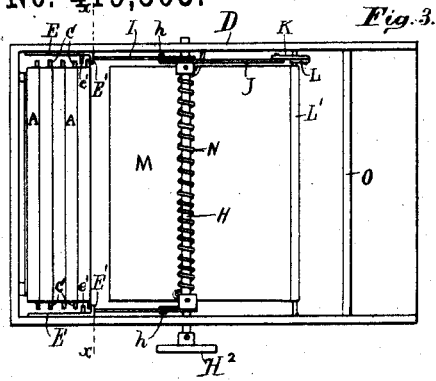
Figure 4:
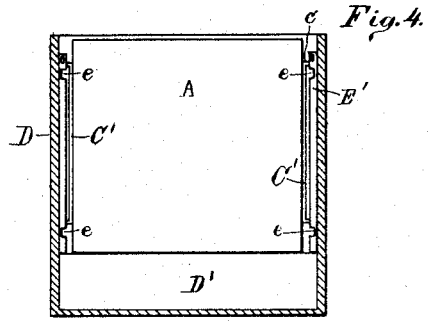
Figure 5:
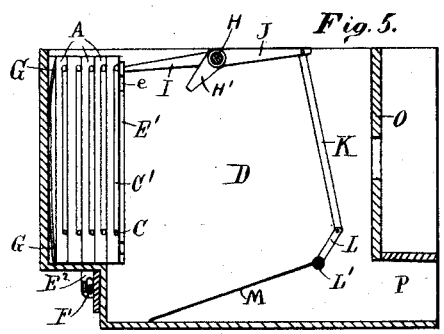
Figure 6:
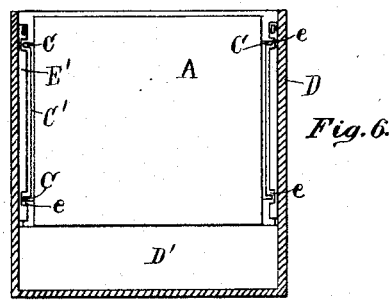
Figure 7:
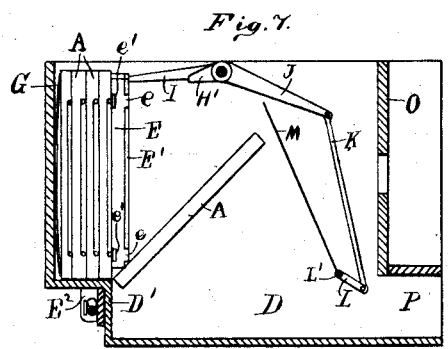
Figure 8:
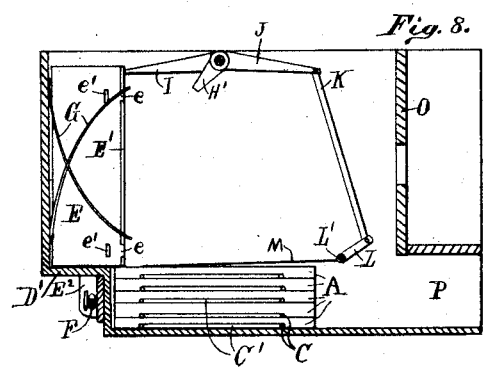
Figure 9:
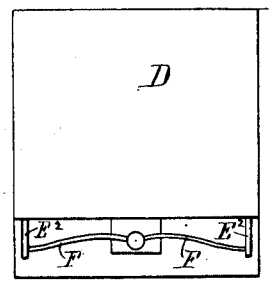
Figure 11:
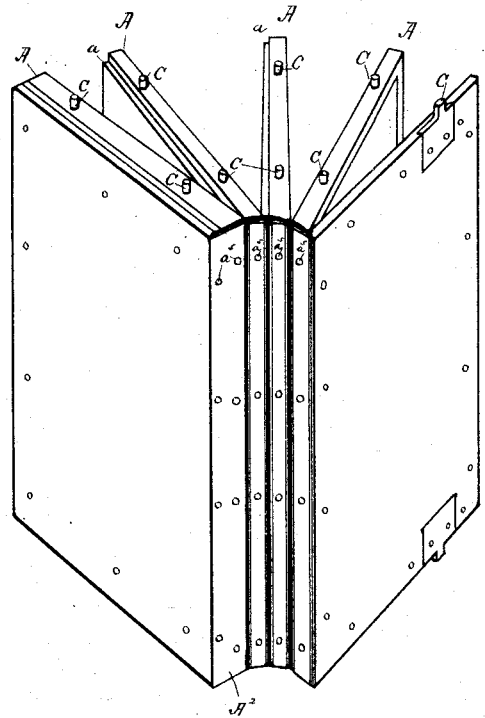
Figure 13:
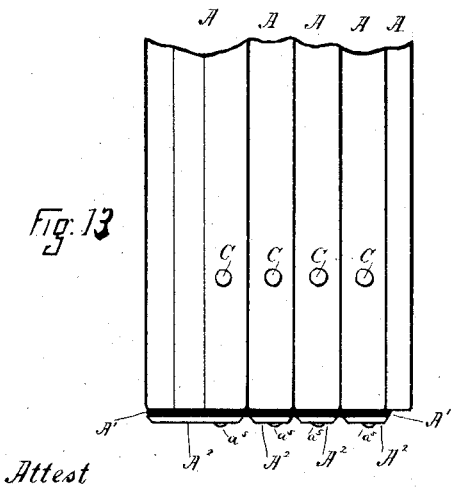
Figure 12:
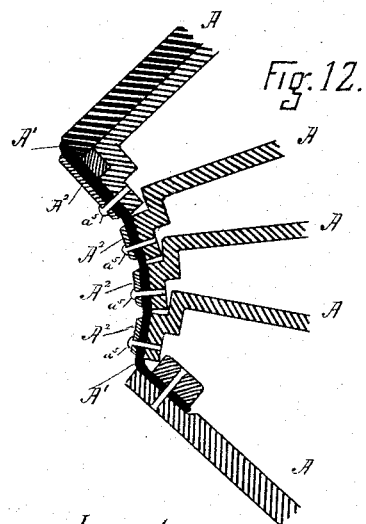

In the accompanying drawings, forming part of this specification, Figure 1 is a perspective view of a camera partly broken away and provided with our improvements. Fig. 2 is a perspective view of a folding plate-holder embodying certain features of our invention, the plate-holder being opened. Fig. 3 is a top view of a camera provided with our improvements, the top of the camera being removed. Fig. 4 is a vertical cross-section, taken at the line $x\,x$ of Fig. 3, and looking from the right side of Fig. 3 toward the left. Fig. 5 is a vertical central longitudinal section. Fig. 6 is a view similar to Fig. 4, but showing a section of the plate-holder in position to drop out. Fig. 7 is a vertical longitudinal central section, showing the first section of the plate-holder dropping and the relation of the various parts, as hereinafter described. Fig. 8 is a longitudinal section showing the relation of the parts after all the sections of the plate-holder have been dropped. In all of the foregoing figures, excepting Fig. 3, the plate-holder is shown in elevation. Fig. 9 is a rear elevation of the camera, showing the preferred form of spring for retracting the slides after being moved, to allow of a section of the plate-holder being dropped. Fig. 10 is a section of the plate-holder, taken in the plane of the line $y\,y$, Fig. 2. Fig. 11 is a perspective view of the plate-holder, illustrating the preferred means of hinging the sections together. Fig. 12 is a section through the back of the plate-holder. Fig. 13 is an edge view of the plate-holder, as shown in Fig. 11.

The plate-holder proper consists of a series of separate plate-holders or sections A, hinged together at one edge like the leaves of an album or book. The preferred means of hinging the sections together is that illustrated in Figs. 11, 12, and 13. The flexible back or strip A′ is attached to the edge of each section, forming a back like that of a book. Gluing may be employed to attach this back A′; but it is preferably secured in place by means of longitudinal strips $A^2$, which are secured in place by pins $a^5$. The edges of the strips $A^2$ are preferably beveled, so as not to interfere with the opening or unfolding of the several sections.

Various methods of excluding the light from the plate may be employed; but the preferred form is as follows, viz: The bottom $a$ of each section is adapted to be received into a recess $a'$ of the next adjoining section. The broken joint so formed prevents any light reaching the plate when adjacent sections are brought together. The plate or film is to be retained in its respective section by any desired means, one mode being shown—viz., the bottom $a$ of each holder being provided with three lugs $a^2\ a^2$ and $a^3$. These lugs serve to retain the plate in the holder.

A spring B is preferably employed behind the plate to hold it securely against the lugs. A spring B′ is also preferably employed to hold the plate down against the opposite edge of the section.

The camera-box D is provided at the rear end with the step D′, on which the plate-holder rests upon being inserted in the camera. The preferred means for successively dropping these sections form one feature of the invention and will now be described. Each section is provided at the sides with two projecting lugs C. These lugs on the device, as now presented, occupy the same relative positions on all the sections. A convenient means for forming these lugs is that shown in the drawings, where a wire C′, with both ends bent outwardly, is shown attached to the edge of each section. The use of these lugs will be more fully described hereinafter.

On each side of the box, immediately over the step D', is a plate E, adapted to move vertically. Each plate E is provided at the front edge with an inwardly-projecting flange E', into which flange are cut notches e. Behind each notch e a lug e' (see Figs. 7 and 8) projects inwardly from the plate, forming a sort of guard to the notch. Each plate E is likewise provided with a downwardly-projecting arm E², to which is attached the spring F, placed under the step D'. The spring F draws the plates E down when the force that raised them is withdrawn.

At the rear end of the camera one or more springs G are attached. These springs bear against the plate-holder and force it forward. A shaft H extends across the camera a short distance in front of the plate-holder and is journaled in the sides of the box. On each side of the camera an arm I is loosely journaled on the shaft H, its other end being hooked into the adjacent plate E.

To hold the dropped section or sections of the plate-holder in position is the object of the mechanism now to be described, which mechanism may be varied, as desired. At one side of the camera the arm J is rigidly attached to the shaft H and projects backwardly. Its free end is connected by means of the rod K with the short arm L, rigidly attached to and projecting from the shaft L'. The shaft L' extends across the camera and is journaled in the sides thereof. The retainer M is attached to the shaft L' and extends across the entire camera. At each side of the camera a short arm H' is attached to shaft H. These arms H' project forwardly, and each is provided with a lug or flange h, which extends outwardly and under the adjacent arm I. The shaft H is also provided with a suitable handle or thumb-wheel H².

The spring N, coiled around the shaft H, has one end attached to the camera-box and the other to the shaft. Its action is to return the retainer M to the position shown in Fig. 5, or as near to that position as the dropped sections will allow, and to exert a pressure upon those sections of the plate-holder which have been dropped sufficient to hold them together with the camera in any position. In view of the position of the plate-holder the camera must be provided with a finder located at the top or side thereof. The lens is supported in a diaphragm, as O. Below the diaphragm, and at the forward part of the camera, is a space P. Through this space or passage P the holder is removed from the camera by sliding the plate-holder forward, the force sufficient to accomplish this being suitably applied.

The mode of operation of the device is as follows: A sensitized plate or film is placed in each section of the plate-holder, except the first, the plate-holder closed up and placed in position in the camera, resting on the step or support D', and having the lugs C of the first section bearing against the flanges E' of the plates E, as shown in Figs. 1, 3, and 5. In this position the notches e in the flange E' of plate E are below the lugs C. When it is desired to bring the first plate into view, the thumb-wheel H² is turned forward. This rocks the shaft H and throws the arms H' upwardly. The lugs h from the arms H' strike against the arms I, and, raising them, also raise the plates E. When the plates E are raised, the notches e are brought opposite the lugs C of the first section, which latter are then forced through the notches by the action of the springs G, and the first section drops down. The same movement of the springs G brings the lugs C of the following section or plate-holder against the lugs e'. This is shown in Fig. 7. As soon as the shaft H is allowed to rotate backward under the influence of the spring N the plates E are drawn down by the spring F. In this movement the lugs C of the second section slip over the lugs e' and are brought directly against the flanges E'. The same movement of the shaft H which raises the arms I also raises the retainer M, as shown in Fig. 7. As successive plates are used they are dropped down in the manner already described until all have been dropped, as illustrated in Fig. 8, when the plate-holder may be removed. As soon as a section falls the retainer M, through the force of spring N, comes down upon the dropped section or sections, as the case may be, holding them together and in their dropped position.

While the various features of our invention are preferably employed together, one or more of said features may be employed without the remainder; and, in so far as applicable, one or more of said features may be employed with cameras other than the one specifically set forth.

What we claim as new, and desire to secure by Letters Patent, is—

1. A removable photographic-plate holder consisting of two or more sections hinged together, substantially as described.

2. In combination with a hinged sectional plate-holder, the several sections being provided with lugs C, the camera D, plates E, provided with flanges E', notches e and lugs e', and means for raising and lowering the plates E, substantially as and for the purposes specified.

3. In combination with a hinged sectional plate-holder, the several sections of which being provided with lugs C, the camera D, plates E, provided with flanges E', notches e and lugs e', arms I, rock-shaft H, provided with tappets to strike arms I, and means for retracting the plates E, substantially as and for the purposes set forth.

4. In combination with a hinged sectional plate-holder, the several sections of which being provided with lugs C, the camera D, plates E, provided with flanges E', notches e and lugs e', arms I, rock-shaft H, provided with tappets to strike arms I, and retracting-spring F, substantially as and for the purposes specified.

5. The combination of shaft H, provided with spring N, arm J, rod K, arm L, shaft L', and retainer M, substantially as and for the purposes specified.

6. The combination of the hinged sectional plate-holder, the retainer M, and intermediate mechanism for operating them, substantially as described.

7. In combination with plates E and means for retracting said plates, lugs C, lugs $e'$, flanges E', having notches $e$, arms I, shaft H, tappets H', spring N, arm J, rod K, arm L, and retainer M, substantially as and for the purposes specified.

8. The combination of a hinged sectional plate-holder and means for successively dropping said sections, retainer M, and means for causing it to secure the sections of the plate-holder in position as they are successively dropped, substantially as described.

9. The combination of a series of sections A, each provided with bottom $a$ and recess $a'$, means for retaining the plate, and flexible back A', attached to the several sections, substantially as and for the purposes specified.

10. The combination of a series of sections A, each provided with bottom $a$ and recess $a'$, means for retaining the plate, and flexible back A', attached to the several sections by means of beveled strips $A^2$ and pins $a^5$, substantially as and for the purposes specified.

11. A removable series of photographic-plate holders, each having a receiving-recess $a'$ and a projecting bottom $a$, substantially as and for the purposes specified.

ALEXANDER DOM.
CLENDON H. SHEEN.

Attest:
W. P. GULICK,
E. M. HARMON.